(12) United States Patent
Arai et al.

(10) Patent No.: US 11,108,102 B2
(45) Date of Patent: Aug. 31, 2021

(54) COOLANT

(71) Applicants: Hiroyuki Arai, Toyota (JP); Yasuaki Kodama, Seto (JP); Masayuki Nagasawa, Shizuoka (JP); Yoshimichi Umehara, Shizuoka (JP); Yoichiro Yoshii, Shizuoka (JP); Yu Sasaki, Shizuoka (JP)

(72) Inventors: Hiroyuki Arai, Toyota (JP); Yasuaki Kodama, Seto (JP); Masayuki Nagasawa, Shizuoka (JP); Yoshimichi Umehara, Shizuoka (JP); Yoichiro Yoshii, Shizuoka (JP); Yu Sasaki, Shizuoka (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/675,689

(22) Filed: Nov. 6, 2019

(65) Prior Publication Data
US 2020/0153061 A1    May 14, 2020

(30) Foreign Application Priority Data
Nov. 14, 2018  (JP) .............................. JP2018-214202

(51) Int. Cl.
| | |
|---|---|
| *H01M 10/65* | (2014.01) |
| *H01M 10/6567* | (2014.01) |
| *C09K 5/20* | (2006.01) |
| *H01M 10/625* | (2014.01) |
| *H01M 10/613* | (2014.01) |

(52) U.S. Cl.
CPC .......... *H01M 10/6567* (2015.04); *C09K 5/20* (2013.01); *H01M 10/613* (2015.04); *H01M 10/625* (2015.04); *H01M 2220/20* (2013.01)

(58) Field of Classification Search
CPC .......... H01M 10/6567; H01M 10/625; H01M 10/613; H01M 2220/20; H01M 8/04029; C09K 5/20; C09K 5/10; Y02E 60/10

USPC ................................ 252/73, 76; 429/438, 62
See application file for complete search history.

(56) References Cited

U.S. PATENT DOCUMENTS

| | | | |
|---|---|---|---|
| 3,607,756 A | 9/1971 | Phillips | |
| 5,484,547 A * | 1/1996 | Mendoza | ............... C09K 3/185 252/73 |
| 7,410,598 B2 | 8/2008 | Eaton et al. | |
| 9,780,380 B2 * | 10/2017 | Chae | ....................... H01M 4/78 |
| 2016/0181660 A1 * | 6/2016 | Dubois | ............. H01M 10/0567 429/199 |
| 2017/0117586 A1 * | 4/2017 | Dubois | ............. H01M 10/0567 |

FOREIGN PATENT DOCUMENTS

DE     102007016738 A1    10/2008

OTHER PUBLICATIONS

STN CAS reg. No. 4437-85-8, Nov. 16. 1984. (Year: 1984).*
STN CAS reg. 108-32-7, Nov. 16, 1984. (Year: 1984).*
"Conductivity (electrolytic)", Wikipedia, 9 pp., Feb. 4, 2021. (Year: 2021).*

* cited by examiner

*Primary Examiner* — Douglas J McGinty
(74) *Attorney, Agent, or Firm* — Dickinson Wright, PLLC

(57) ABSTRACT

The present disclosure provides a battery coolant for an electric vehicle that has a low conductivity, a low ion elution performance, a low viscosity at a very low temperature, and a cooling performance equivalent to that of an aqueous coolant composition in a driving temperature range. The present disclosure relates to a battery coolant for an electric vehicle containing at least one kind of carbonates selected from the group consisting of propylene carbonate and butylene carbonate in an amount of 90 mass % or more with respect to a total mass of the coolant and water in an amount of 3 mass % or less with respect to the total mass of the coolant.

8 Claims, No Drawings

COOLANT

CROSS REFERENCE TO RELATED APPLICATIONS

The present application claims priority from Japanese patent application JP 2018-214202 filed on Nov. 14, 2018, the content of which is hereby incorporated by reference into this application.

BACKGROUND

Technical Field

The present disclosure relates to a coolant, especially a battery coolant for an electric vehicle.

Description of Related Art

Recently, environmental problems have been emphasized, and electric vehicles that do not emit carbon dioxide as a greenhouse gas are attracting attention.

Conventionally, as a coolant for a fuel cell device or a battery used as a power source of the electric vehicle, a water having a high cooling performance and a coolant composition containing ethylene glycol as a base have been used. However, since what is called pure water without an electrolyte and the like freezes at Celsius 0° C. or less and increases in volume, a radiator and the like are possibly damaged. Furthermore, the ethylene glycol has a property deteriorated depending on a usage environment.

For such a problem, for example, U.S. Pat. No. 7,410,598 discloses a coolant composition for a fuel cell vehicle containing 1,3-propanediol (PDO), which is highly resistant to deterioration and has a low viscosity at a very low temperature, as a base.

SUMMARY

For a battery coolant for an electric vehicle, a conductive property (conductivity) may be low, that is, an electrical resistivity may be high. For example, when the coolant leaks due to an accident or the like, the coolant having a high conductivity possibly causes a short circuit and/or ignition in a battery by contacting a battery terminal.

For the battery coolant for the electric vehicle, ion elution performance may be low. An aqueous coolant having a high ion elution performance, for example, the coolant composition disclosed in U.S. Pat. No. 7,410,598, possibly dissolves a material contained in a radiator, for example, flux, by the use to increase the conductivity. While the flux can be removed by cleaning the radiator in advance, this increases a process to increase the cost.

Furthermore, for the battery coolant for the electric vehicle, the viscosity at the very low temperature may be low. A high viscosity at the very low temperature increases a load to a water pump, resulting in a large loss of electricity.

For example, as a material having the property of the low conductivity and the low ion elution performance, a mineral oil, a silicone oil, and the like, which are non-aqueous materials, are included. However, the mineral oil and the silicone oil have significantly low cooling performances compared with the aqueous coolant composition.

Therefore, the present disclosure provides a battery coolant for an electric vehicle that has a low conductivity, a low ion elution performance, a low viscosity at a very low temperature, and a cooling performance equivalent to that of an aqueous coolant composition in a driving temperature range.

Various kinds of heat transfer media have been conventionally used.

For example, U.S. Pat. No. 3,607,756 discloses a liquid heat transfer medium that contains 5 volume % to 65 volume % of propylene glycol, 4 volume % to 85 volume % of propylene carbonate, and 5 volume % to 55 volume % of water.

Furthermore, German Patent Application Publication No. 102007016738 discloses a heat transfer fluid for solar consisting of propylene carbonate.

Non-aqueous carbonates used as the heat transfer media in the above-described documents are also used as materials of electrolytes for lithium-ion batteries, and have high permittivity. Typically, since it is presumed that the ion elution performance is high when the permittivity is high, the non-aqueous carbonates have been presumed to be unsuitable for the battery coolant for the electric vehicle, which may have the low ion elution performance.

However, the present inventors have conducted concentrated studies concerning a battery coolant, and found that; surprisingly, the carbonates, such as non-aqueous propylene carbonate (PC) and butylene carbonate (BC), have the low ion elution performance; further, the carbonates and compositions containing a certain amount of the carbonates have the low conductivity after a heat resistance test, the low viscosity at the very low temperature, the low ion elution performance, and the cooling performance equivalent to that of the aqueous coolant composition in the driving temperature range; and the carbonates are appropriate for the battery coolant for the electric vehicle. Thus, the inventors reached the present disclosure.

That is, the gist of the present disclosure is as follows.

(1) A battery coolant for an electric vehicle containing:

at least one kind of carbonates selected from the group consisting of propylene carbonate and butylene carbonate in an amount of 90 mass % or more with respect to a total mass of the coolant; and water in an amount of 3 mass % or less with respect to the total mass of the coolant.

(2) The coolant according to (1), wherein the coolant does not contain water.

(3) The coolant according to (1) or (2), wherein the carbonates are propylene carbonate.

(4) The coolant according to any one of (1) to (3) further containing glycols in an amount of 10 mass % or less with respect to the total mass of the coolant.

(5) The coolant according to claim 4), wherein the glycols are at least one kind of the glycols selected from the group consisting of ethylene glycol, diethylene glycol, triethylene glycol, tetraethylene glycol, 1,3-propanediol, propylene glycol (1,2-propanediol), dipropylene glycol, butanediol, pentanediol, and hexylene glycol.

(6) The coolant according to any one of (1) to (5) further containing at least one kind of compounds selected from the group consisting of benzotriazole and tolyltriazole in an amount of 0.01 mass % to 3 mass % in total with respect to the total mass of the coolant.

(7) A method for using at least one kind of carbonates selected from the group consisting of propylene carbonate and butylene carbonate as a battery coolant for an electric vehicle.

(8) The method according to (7), wherein the carbonates are propylene carbonate.

EFFECTS

The present disclosure provides a battery coolant for an electric vehicle that has a low conductivity, a low ion elution performance, a low viscosity at a very low temperature, and a cooling performance equivalent to that of an aqueous coolant composition in a driving temperature range.

DETAILED DESCRIPTION OF THE EMBODIMENTS

The following describes embodiments of the present disclosure in detail.

A battery coolant for an electric vehicle and a method for using carbonates as the battery coolant for the electric vehicle according to the present disclosure is not limited to the following embodiments, and can be performed in various configurations where changes, improvements, and the like which a person skilled in the art can make are given without departing from the gist of the present disclosure.

The present disclosure relates to a battery coolant for an electric vehicle that contains a certain amount or more of carbonates and a certain amount or less of water.

In the battery coolant for the electric vehicle of the present disclosure, the carbonates are at least one kind selected from the group consisting of propylene carbonate and butylene carbonate. The carbonates may be propylene carbonate.

In the battery coolant for the electric vehicle of the present disclosure, the amount (concentration) of the carbonates is 90 mass % or more with respect to the total mass of the battery coolant for the electric vehicle, and in some embodiments, may be 95 mass % or more with respect to the total mass of the battery coolant for the electric vehicle, and in other embodiments, may be 97.5 mass % or more with respect to the total mass of the battery coolant for the electric vehicle.

In the battery coolant for the electric vehicle of the present disclosure, the upper limit of the amount (concentration) of the carbonates is not limited. For example, the amount (concentration) of the carbonates is ordinarily 99.9 mass % or less with respect to the total mass of the battery coolant for the electric vehicle, and in some embodiments, may be 99.0 mass % or less with respect to the total mass of the battery coolant for the electric vehicle.

Since the battery coolant for the electric vehicle of the present disclosure contains the above-described amount of the carbonates, a coolant that has a low conductivity after a heat resistance test, a low viscosity at a very low temperature, a low ion elution performance, and a cooling performance equivalent to that of an aqueous coolant composition in a driving temperature range is achieved.

In the battery coolant for the electric vehicle of the present disclosure, an amount of water (water content) is 3 mass % or less with respect to the total mass of the coolant, and in some embodiments, may be 1 mass % or less with respect to the total mass of the coolant. Since the water content may be low as much as possible, the lower limit value is not configured. In other embodiments, the coolant for the present disclosure does not contain water.

In the battery coolant for the electric vehicle of the present disclosure, the phrase "does not contain water" means that the coolant does not substantially contain water. Accordingly, the phrase "does not contain water" includes not only a case wherein the water content is 0 mass % with respect to the total mass of the coolant, but also a case wherein the water content is an inevitable amount caused by various conditions, for example, a manufacturing method, a manufacturing device, a raw material to be used, a moisture absorbency, and a storage condition of the coolant.

Since the battery coolant for the electric vehicle of the present disclosure contains the above-described amount of water or does not contain water, the coolant that has the low viscosity at the very low temperature, and the low ion elution performance is achieved.

The battery coolant for the electric vehicle of the present disclosure may further contain glycols. The glycols are not limited insofar as the glycols are known in the technical field. The glycols may be at least one kind of glycols selected from the group consisting of ethylene glycol, diethylene glycol, triethylene glycol, tetraethylene glycol, 1,3-propanediol, propylene glycol (1,2-propanediol), dipropylene glycol, butanediol, pentanediol, and hexylene glycol. Note that dipropylene glycol, butanediol, pentanediol, and hexylene glycol may be each a mixture of isomers or a pure isomer.

In the battery coolant for the electric vehicle of the present disclosure, the amount (concentration) of the glycols is ordinarily 10 mass % or less with respect to the total mass of the battery coolant for the electric vehicle, and in some embodiments, may be 5 mass % or less with respect to the total mass of the battery coolant for the electric vehicle, and in other embodiments, may be 2.5 mass % or less with respect to the total mass of the battery coolant for the electric vehicle.

In the battery coolant for the electric vehicle of the present disclosure, the lower limit value of the amount of the glycols is not limited. For example, the amount (concentration) of the glycols is ordinarily 0.5 mass % or more with respect to the total mass of the battery coolant for the electric vehicle, and in some embodiments, may be 1 mass % or more with respect to the total mass of the battery coolant for the electric vehicle.

The battery coolant for the electric vehicle of the present disclosure may not contain the glycols. In some embodiments, the battery coolant for the electric vehicle of the present disclosure does not contain the glycols. The phrase "does not contain the glycols" means that the coolant does not substantially contain the glycols. Accordingly, the phrase "does not contain the glycols" includes not only a case wherein the amount of the glycols is 0 mass % with respect to the total mass of the coolant, but also a case wherein the amount of the glycols is an inevitable amount caused by various conditions, for example, a manufacturing method, a manufacturing device, and a raw material to be used of the coolant.

Since the battery coolant for the electric vehicle of the present disclosure contains the above-described amount of the glycols or does not contain the glycols, the coolant that has the low viscosity at the very low temperature, and the cooling performance equivalent to that of the aqueous coolant composition in the driving temperature range is achieved.

The battery coolant for the electric vehicle of the present disclosure may further contain at least one kind of compounds selected from the group consisting of benzotriazole and tolyltriazole. The battery coolant for the electric vehicle of the present disclosure may contain tolyltriazole. The amount (concentration) of the at least one kind of compounds selected from the group consisting of benzotriazole and tolyltriazole is ordinarily 0.01 mass % to 3 mass % in total with respect to the total mass of the coolant, and in some embodiments, may be 0.1 mass % to 0.5 mass % in total with respect to the total mass of the coolant.

Since the battery coolant for the electric vehicle of the present disclosure contains the above-described amount of the at least one kind of compounds selected from the group consisting of benzotriazole and tolyltriazole, the coolant having the low ion elution performance, that is, the coolant having the anti-rust effect is achieved.

The battery coolant for the electric vehicle of the present disclosure may further contain material(s), such as a dye, an anti-foam agent, a bittering agent, and the like. The battery coolant for the electric vehicle of the present disclosure can contain the material(s) in an amount of a range wherein the properties of the coolant described below are not impaired.

The battery coolant for the electric vehicle of the present disclosure has the conductivity after the heat resistance test of 1.6 µS/cm or less. In some embodiments, the battery coolant for the electric vehicle of the present disclosure may have the conductivity after the heat resistance test of 1.0 µS/cm or less. Here, the conductivity after the heat resistance test is a conductivity of the coolant after being subjected to the following heat resistance test. In the heat resistance test, the coolant is sealed, left to stand at 120° C. for 84 hours, and subsequently, adjusted to 25° C.

The battery coolant for the electric vehicle of the present disclosure has the viscosity, which is measured with a shear rate of 50 $s^{-1}$ at the very low temperature (−30° C.), of 250 mPa·s or less. In some embodiments, the battery coolant for the electric vehicle of the present disclosure may have the viscosity, which is measured with a shear rate of 50 $s^{-1}$ at the very low temperature (−30° C.), of 100 mPa·s or less. Here, the viscosity measured with the shear rate of 50 $s^{-1}$ at −30° C. is a value measured using a rheometer equipped with a parallel plate.

The battery coolant for the electric vehicle of the present disclosure has a conductivity in an ion elution test of 1.0 µS/cm or less. In some embodiments, the battery coolant for the electric vehicle of the present disclosure has a conductivity in an ion elution test of 0.7 µS/cm or less. Here, the conductivity in the ion elution test is a conductivity of the coolant after being subjected to the following ion elution test. In the ion elution test, the coolant is mixed with a flux (FL-7 manufactured by Morita Chemical Industries CO., LTD.) in an amount of 0.1 mass % with respect to the total mass of the coolant, stirred for two hours, and subsequently, adjusted to 25° C.

The battery coolant for the electric vehicle of the present disclosure has a heat transfer coefficient h as the cooling performance, which is calculated with the following formula, of 1000 W/(m²·K) or more. In some embodiments, the battery coolant for the electric vehicle of the present disclosure may have a heat transfer coefficient h as the cooling performance, which is calculated with the following formula, of 1200 W/(m²·K) or more.

cooling performance=heat transfer coefficient $h$ (W/(m²·K))=Nusselt number×heat conductivity (W/(m·K))/pipe diameter (set to 0.01 m)

Wherein, Nusselt number=$0.023 \times Re^{0.8} \times Pr^{0.33}$ (based on Colburn formula)

Reynolds number (Re)=density (kg/m³)×flow rate (set to 1 m/s)×pipe diameter (set to 0.01 m)/viscosity (Pa·s)

Prandtl number (Pr)=viscosity (Pa·s)×specific heat (J/(kg·K))/heat conductivity (W/(m·K))

The battery coolant for the electric vehicle of the present disclosure has the low conductivity after the heat resistance test, the low viscosity at the very low temperature, the low ion elution performance, and the cooling performance equivalent to that of the aqueous coolant composition in the driving temperature range. Accordingly, since the battery coolant for the electric vehicle of the present disclosure keeps the state of the low conductivity, a short circuit and/or ignition in the battery can be suppressed even when, for example, the coolant leaks due to an accident or the like to be brought in contact with a battery terminal. Furthermore, since the battery coolant for the electric vehicle of the present disclosure has the low ion elution performance, dissolution of the flux (eluted material) possibly present in the radiator into the coolant can be suppressed to keep the conductivity low. This eliminates the need for cleaning the radiator in advance, ensuring the reduction of the cost for the cleaning. Furthermore, since the battery coolant for the electric vehicle of the present disclosure has the low viscosity at the very low temperature, the load to the water pump can be decreased, thus ensuring the reduction of the loss of electricity.

The battery coolant for the electric vehicle of the present disclosure can be prepared with a method known in the technical field excluding that the components described above are used in the amounts described above. In the preparation of the battery coolant for the electric vehicle of the present disclosure, an order of adding the components, an addition temperature, a mixing method, a mixing time, and the like are not limited, and the components are each mixed so as to be uniformly dispersed in the coolant. The manufactured coolant may be passed through an ion-exchange resin to remove ions contained in the coolant, as necessary.

Furthermore, the present disclosure relates to a method for using carbonates as a battery coolant for an electric vehicle.

Here, the carbonates are at least one kind selected from the group consisting of propylene carbonate and butylene carbonate. The carbonates may be propylene carbonate.

The carbonates have the low conductivity after the heat resistance test, the low viscosity at the very low temperature, the low ion elution performance, and the cooling performance equivalent to that of the aqueous coolant composition in the driving temperature range. Accordingly, when the carbonates are used as the battery coolant for the electric vehicle, since the carbonates keep the state of the low conductivity, a short circuit and/or ignition in the battery can be suppressed even when, for example, the coolant leaks due to an accident or the like to be brought in contact with a battery terminal. Furthermore, when the carbonates are used as the battery coolant for the electric vehicle, since the carbonates have the low ion elution performance, dissolution of the flux (eluted material) possibly present in the radiator into the coolant can be suppressed to keep the conductivity low. This eliminates the need for cleaning the radiator in advance, ensuring the reduction of the cost for the cleaning. Furthermore, when the carbonates are used as the battery coolant for the electric vehicle, since the carbonates have the low viscosity at the very low temperature, the load to the water pump can be decreased, thus ensuring the reduction of the loss of electricity.

EXAMPLES

The following describes some examples according to the present disclosure, but the description is not intended to limit the present disclosure to such examples.

[Preparing Compositions of Examples 1 to 5 and Comparative Examples 1 to 9]

Propylene carbonate, butylene carbonate, ethylene glycol, 1,2-propanediol, 1,3-propanediol, water, tolyltriazole, and silicone oil, as raw materials, were mixed in a combined amount (pts·mass) indicated in Table 1 so as to become 100 pts·mass in total, and thus the compositions of Examples 1 to 5 and Comparative Examples 1 to 9 were manufactured.

[Evaluation of Compositions of Examples 1 to 5 and Comparative Examples 1 to 9]

The following evaluation tests were performed on the obtained coolants.

1. Conductivity after Heat Resistance Test 100 ml of the compositions of Examples 1 to 5 and Comparative Examples 1 to 9 were each put into a screw mouth bottle of 250 ml, sealed, and allowed to stand for 84 hours under an environment at 120° C. Afterwards, the screw mouth bottles were each taken out and adjusted to 25° C., and subsequently, the conductivities were measured. For the conductivity measurement, SC72 Personal Handheld Conductivity Meter and a detector SC72SN-11 (for pure water), which were manufactured by Yokogawa Electric Corporation, were used.

2. Viscosity at Very Low Temperature (−30° C.)

The viscosities of the compositions of Examples 1 to 5 and Comparative Examples 1 to 9 were measured using the rheometer equipped with the parallel plate manufactured by Anton Paar. The viscosities were measured in the temperature range of −30° C. to 65° C. with a temperature increase rate of 10° C./minute and the shear rate of 50 s$^{-1}$.

3. Ion Elution Performance

The compositions of Examples 1 to 5 and Comparative Examples 1 to 9 were mixed with the flux (FL-7, manufactured by Morita Chemical Industries CO., LTD.) in an amount of 0.1 mass % with respect to the total mass of the coolant, adjusted to 25° C. after stirring for two hours, and the conductivities were measured. For the conductivity measurement, SC72 Personal Handheld Conductivity Meter and a detector SC72SN-11 (for pure water), which were manufactured by Yokogawa Electric Corporation, were used.

4. Cooling Performance

For the compositions of Examples 1 to 5 and Comparative Examples 1 to 9, the heat transfer coefficient h (W/(m$^2$·K)) as the cooling performance calculated with the following formula was calculated.

cooling performance=heat transfer coefficient $h$ (W/(m$^2$·K))=Nusselt number×heat conductivity (W/(m·K))/pipe diameter (which was set to 0.01 m)

Wherein, Nusselt number=$0.023 \times Re^{0.8} \times Pr^{0.33}$ (based on Colburn formula)

Reynolds number (Re)=density (kg/m$^3$)×flow rate (which was set to 1 m/s)×pipe diameter (which was set to 0.01 m)/viscosity (Pa·s)

Prandtl number (Pr)=viscosity (Pa·s)×specific heat (J/(kg·K))/heat conductivity (W/(m·K))

The specific heat at 20° C., the heat conductivity at 20° C., and the density at 20° C. were calculated based on literature data, and for the viscosity at 20° C., the value measured in "2. Viscosity at Very Low Temperature (−30° C.)" described above was used.

TABLE 1

| Item | Item details | | Example 1 | Example 2 | Example 3 | Example 4 | Example 5 |
|---|---|---|---|---|---|---|---|
| Composition (mass %) | Propylene carbonate (PC) | | 100 | 90 | 99.7 | | 50 |
| | Butylene carbonate (BC) | | | | | 100 | 50 |
| | Ethylene glycol | | | | | | |
| | 1,2-Propanediol (PG) | | | 10 | | | |
| | 1,3-Propanediol (PDO) | | | | | | |
| | Water | | | | | | |
| | Tolyltriazole | | | | 0.3 | | |
| | Silicone oil | | | | | | |
| | Sum | | 100 | 100 | 100 | 100 | 100 |
| Performance | Conductivity after heat resistance test | µS/cm (1.6 µS/cm or less) | 0.33 | 0.316 | 0.45 | 0.054 | 0.171 |
| | Viscosity at very low temperature @−30° C. | mPa·s (250 mPa·s or less) | 15 | 20 | 15 | 26 | 20 |
| | Ion elution performance | µS/cm (1.0 µS/cm or less) | 0.5 | 0.5 | 0.7 | 0.4 | 0.2 |
| | Specific heat @20° C. | J/(kg·K) | 2571 | 2.609 | 2571 | 2571 | 2571 |
| | Heat conductivity @20° C. | W/(m·K) | 0.21 | 0.21 | 0.21 | 0.21 | 0.21 |
| | Viscosity @20° C. | mPa·s | 2.8 | 3.5 | 2.8 | 3.5 | 3.0 |
| | Density @20° C. | kg/m$^3$ | 1206 | 1189 | 1206 | 1140 | 1173 |
| | Re*1 | (No dimension) | 4370 | 3435 | 4370 | 3257 | 3910 |
| | Pr*2 | (No dimension) | 34 | 43 | 34 | 43 | 37 |
| | Nu*3 | (No dimension) | 60 | 54 | 60 | 51 | 56 |
| | Cooling performance @20° C.*4 | W/(m$^2$·K) (1000 W/(m$^2$·K) or more) | 1261 | 1125 | 1261 | 1078 | 1186 |

| Item | Item details | | Comparative Example 1 | Comparative Example 2 | Comparative Example 3 | Comparative Example 4 | Comparative Example 5 |
|---|---|---|---|---|---|---|---|
| Composition (mass %) | Propylene carbonate (PC) | | | | | | |
| | Butylene carbonate (BC) | | | | | | |
| | Ethylene glycol | | | 50 | | | |
| | 1,2-Propanediol (PG) | | 100 | | 50 | | |
| | 1,3-Propanediol (PDO) | | | | | 50 | |
| | Water | | | 50 | 50 | 50 | 100 |
| | Tolyltriazole | | | | | | |
| | Silicone oil | | | | | | |
| | Sum | | 100 | 100 | 100 | 100 | 100 |
| Performance | Conductivity after heat resistance test | µS/cm (1.6 µS/cm or less) | 0.05 | 18.9 | 1.49 | 1.73 | 0.8 |
| | Viscosity at very low temperature @−30° C. | mPa·s (250 mPa·s or less) | 5490 | 60 | 232 | 100 | Frozen |

TABLE 1-continued

| | | | | | |
|---|---|---|---|---|---|
| Ion elution performance | μS/cm (1.0 μS/cm or less) | 0.1 | 93.0 | 35.7 | 12.4 | 785 |
| Specific heat @20° C. | J/(kg · K) | 2950 | 3300 | 3565 | 3368 | 4180 |
| Heat conductivity @20° C. | W/(m · K) | 0.21 | 0.43 | 0.40 | 0.41 | 0.60 |
| Viscosity @20° C. | mPa · s | 49.0 | 4.0 | 6.0 | 6.3 | 1.0 |
| Density @20° C. | kg/m³ | 1032 | 1056 | 1037 | 1026 | 998 |
| Re*1 | (No dimension) | 211 | 2639 | 1728 | 1628 | 9962 |
| Pr*2 | (No dimension) | 702 | 31 | 53 | 52 | 7 |
| Nu*3 | (No dimension) | 14 | 39 | 33 | 31 | 69 |
| Cooling performance @20° C.*4 | W/(m² · K) (1000 W/(m² · K) or more) | 298 | 1661 | 1340 | 1289 | 4150 |

| Item | Item details | | Comparative Example 6 | Comparative Example 7 | Comparative Example 8 | Comparative Example 9 |
|---|---|---|---|---|---|---|
| Composition (mass %) | Propylene carbonate (PC) | | | 95 | 50 | 25 |
| | Butylene carbonate (BC) | | | | | |
| | Ethylene glycol | | | | | |
| | 1,2-Propanediol (PG) | | | | 50 | 25 |
| | 1,3-Propanediol (PDO) | | | | | |
| | Water | | | 5 | | 50 |
| | Tolyltriazole | | | | | |
| | Silicone oil | | 100 | | | |
| | Sum | | 100 | 100 | 100 | 100 |
| Performance | Conductivity after heat resistance test | μS/cm (1.6 μS/cm or less) | 0.00 | 0.48 | 0.29 | 8.60 |
| | Viscosity at very low temperature @−30° C. | mPa · s (250 mPa · s or less) | 25 | Frozen | 124 | Frozen |
| | Ion elution performance | μS/cm (1.0 μS/cm or less) | 0.0 | 1.6 | 1.0 | 64.0 |
| | Specific heat @20° C. | J/kg · K | 1700 | 2651 | 2760 | 3470 |
| | Heat conductivity @20° C. | W/(m · K) | 0.12 | 0.23 | 0.21 | 0.41 |
| | Viscosity @20° C. | mPa · s | 5.0 | 3.1 | 8.8 | 3.9 |
| | Density @20° C. | kg/m³ | 920 | 1196 | 1119 | 1059 |
| | Re*1 | (No dimension) | 1840 | 3920 | 1277 | 2707 |
| | Pr*2 | (No dimension) | 71 | 35 | 116 | 34 |
| | Nu*3 | (No dimension) | 38 | 56 | 34 | 41 |
| | Cooling performance @20° C.*4 | W/(m² · K) (1000 W/(m² · K) or more) | 461 | 1282 | 702 | 1654 |

*Values in parentheses in Performance are desired values in respective performances.
*1Reynolds number = density (kg/m³) × flow rate (set to 1 m/s) × pipe diameter (set to 0.01 m)/viscosity (Pa · s)
*2Prandtl number = viscosity (Pa · s) × specific heat (J/(kg · K))/heat conductivity (W/(m · K))
*3Nusselt number = 0.023 × Re$^{0.8}$ × Pr$^{0.33}$ (Colburn formula)
*4Cooling performance = heat transfer coefficient h (W/(m² · K)) = Nusselt number × heat conductivity (W/(m · K))/pipe diameter (set to 0.01 m)

In each Example 1 to 5, the conductivity after the heat resistance test was low, the viscosity at the very low temperature (−30° C.) was low, the ion elution performance was low, and the cooling performance was high. Accordingly, it was found that Examples 1 to 5 were appropriate for the battery coolant for the electric vehicle.

Meanwhile, Comparative Example 1 had the composition of 1,2-propanediol (PG) alone, and was excellent in having the low conductivity after the heat resistance test and the low ion elution performance, but the viscosity at the very low temperature thereof was high and the cooling performance thereof was low.

Comparative Examples 2, 3, and 4 were glycol water solutions, which are general as an ordinary aqueous coolant composition, but the ion elution performances thereof were high.

Comparative Example 5 had the composition of water alone, but Comparative Example 5 froze at the very low temperature and the ion elution performance thereof was high.

Comparative Example 6 was a silicone oil (SH200 manufactured by TORAY, kinematic viscosity 5.0 mm²/s at 25° C.), which is general as a non-aqueous heating medium and an electrical insulating oil, and was excellent in having the low ion elution performance, but the cooling performance thereof was low.

Comparative Examples 7 and 9 had the compositions wherein water was blended to PC, but Comparative Examples 7 and 9 froze at the very low temperature and the ion elution performances thereof were high.

Comparative Example 8 had the composition containing much PG, but the cooling performance thereof was low.

All publications, patents and patent applications cited in the present description are herein incorporated by reference as they are.

What is claimed is:

1. A battery coolant for an electric vehicle containing:
   at least one kind of carbonates selected from the group consisting of propylene carbonate and butylene carbonate, in an amount of 90 mass % or more with respect to a total mass of the coolant;
   at least one compound selected from the group consisting of benzotriazole and tolyltriazole in an amount of 0.01 mass % to 3 mass % in total with respect to the total mass of the coolant and
   water in an amount of 3 mass % or less with respect to the total mass of the coolant, said battery coolant having a conductivity of 1.0 μS/cm or less.

2. The coolant according to claim 1,
   wherein the coolant does not contain water.

3. The coolant according to claim 1,
   wherein the carbonates are propylene carbonate.

4. The coolant according to claim 2,
   wherein the carbonates are propylene carbonate.

5. The coolant according to claim 1, further containing glycols in an amount of 10 mass % or less with respect to the total mass of the coolant.

6. The coolant according to claim 2, further containing glycols in an amount of 10 mass % or less with respect to the total mass of the coolant.

7. The coolant according to claim 3, further containing glycols in an amount of 10 mass % or less with respect to the total mass of the coolant.

8. The coolant according to claim 5, wherein the glycols are at least one kind of the glycols selected from the group consisting of ethylene glycol, diethylene glycol, triethylene glycol, tetraethylene glycol, 1,3-propanediol, propylene glycol, dipropylene glycol, butanediol, pentanediol, and hexylene glycol.

* * * * *

UNITED STATES PATENT AND TRADEMARK OFFICE
CERTIFICATE OF CORRECTION

| | | |
|---|---|---|
| PATENT NO. | : 11,108,102 B2 | Page 1 of 1 |
| APPLICATION NO. | : 16/675689 | |
| DATED | : August 31, 2021 | |
| INVENTOR(S) | : Hiroyuki Arai et al. | |

It is certified that error appears in the above-identified patent and that said Letters Patent is hereby corrected as shown below:

On the Title Page

A second Assignee should be entered, as follows:
(73) Assignees: TOYOTA JIDOSHA KABUSHIKI KAISHA, Toyota (JP)
              JAPAN CHEMICAL INDUSTRIES CO., LTD., Shizuoka (JP)

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*